April 7, 1953

C. P. ROUNSEFELL 2,633,774

FILM PROJECTING AND VIEWING APPARATUS WITH FILM LOCATING MEANS

Filed July 16, 1949

INVENTOR
Clifford P. Rounsefell
BY
Dale A. Bauer
ATTORNEY

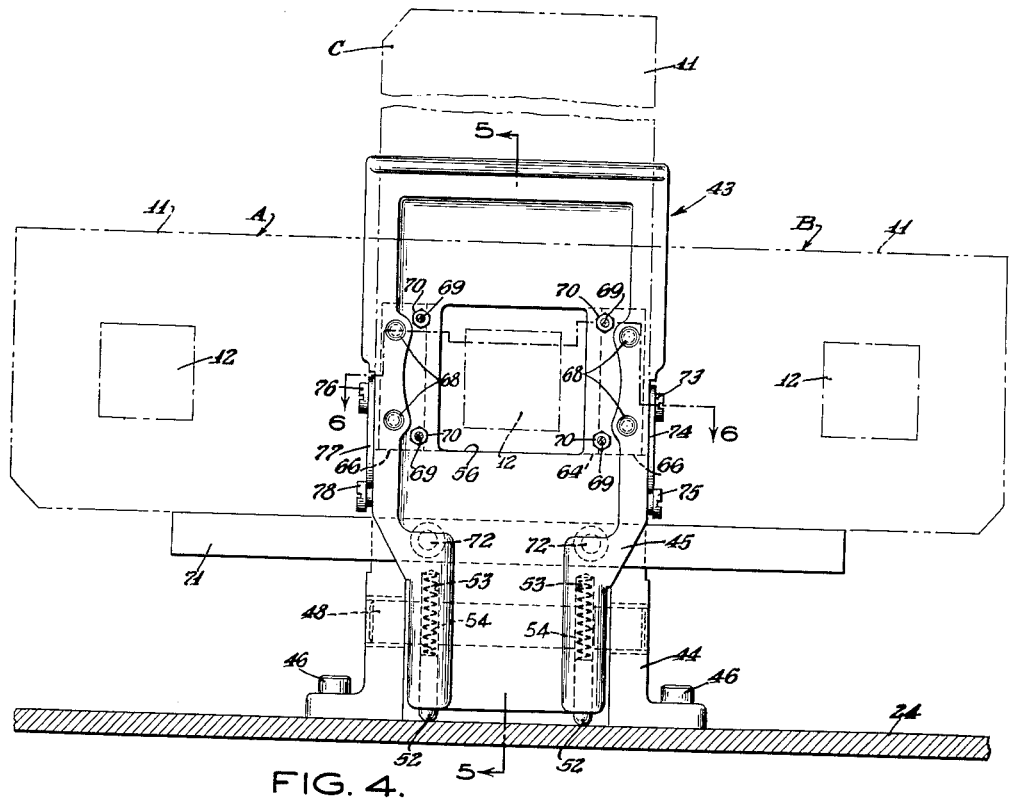
FIG. 4.
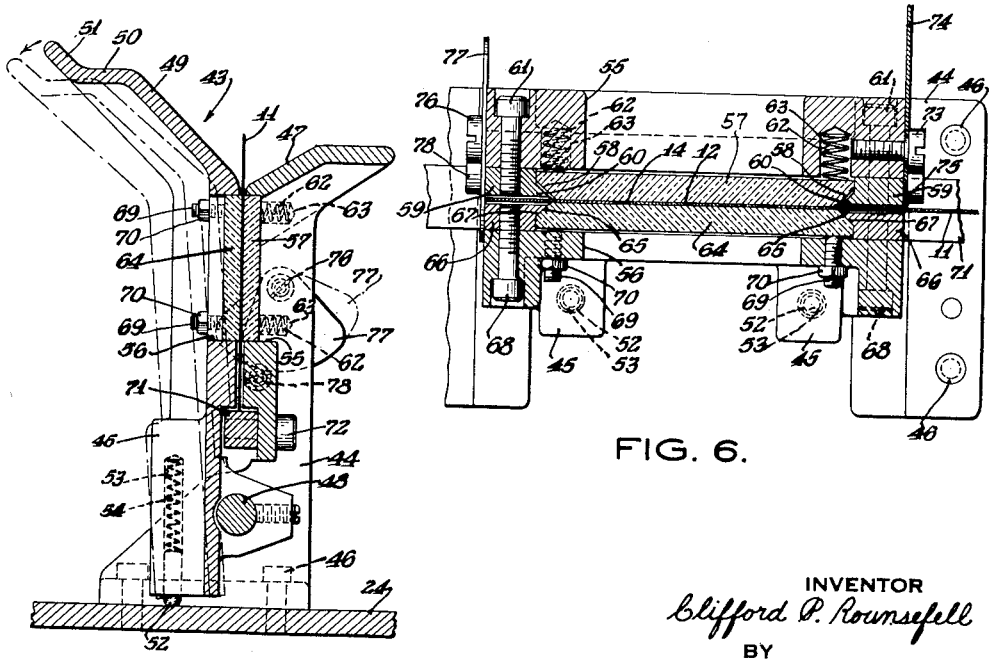
FIG. 5.
FIG. 6.
INVENTOR
Clifford P. Rounsefell
BY
Dale A. Bauer
ATTORNEY Patented Apr. 7, 1953

2,633,774

UNITED STATES PATENT OFFICE 2,633,774

FILM PROJECTING AND VIEWING APPARATUS WITH FILM LOCATING MEANS

Clifford P. Rounsefell, Pearl River, N. Y., assignor, by mesne assignments, to Filmsort Inc., a corporation of Delaware Application July 16, 1949, Serial No. 105,125

10 Claims. (Cl. 88—28)

This invention relates to apparatus for projecting and viewing transparencies, such as micro-films, and more particularly to such apparatus which is especially adapted for projecting and viewing micro-films mounted in apertured cards or the like.

One of the objects of the present invention is to provide a projecting and viewing apparatus for the above purpose having means of novel and simple construction for supporting and locating the cards or the like in proper position for accurate projection of the micro-films carried thereby onto a screen.

Another object of the invention is to provide an apparatus of the above character having novel means for supporting and locating cards or the like in various positions whereby micro-films carried by said cards may be accurately projected onto a screen in the desired upright naturally handed position.

Another object is to provide a projecting and viewing apparatus having a novel and simple card holding and positioning device which requires no preliminary settings or adjustments and yet is capable of properly locating cards in various positions whereby one micro-film or either selected one of two micro-films carried by each card may be accurately projected onto a screen and in upright naturally handed position.

A further object is to provide a projecting and viewing apparatus for micro-films carried by apertured cards or the like, having a pair of card stops arranged in a novel manner, whereby said stops are displaceable by the cards from card locating positions upon insertion of the cards in the holder therefor, and may be alternately or collectively employed to locate the cards in various positions for projecting purposes.

Still another object is to provide an apparatus of the above character wherein the card, particularly the portion thereof surrounding the micro-film, is clamped between two plates of light-transmitting material arranged in a novel manner, whereby said film is held absolutely flat and projection of a clear, sharp and undistorted image onto the screen is thus assured.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a side elevation, partly in section, of a projecting and viewing apparatus embodying the present invention;

Fig. 4 is an end elevation, on an enlarged scale, of a card holder constructed in accordance with the present invention and shown in Fig. 1, said view showing a card in broken lines in the various positions it may occupy in said holder for projecting purposes;

Fig. 5 is a vertical transverse sectional view on the line 5—5 of Fig. 4; and

Fig. 6 is a horizontal sectional view on the irregular line 6—6 of Fig. 4, said view being on a still larger scale for purposes of clearer illustration.

Figures 1, 2, 3:
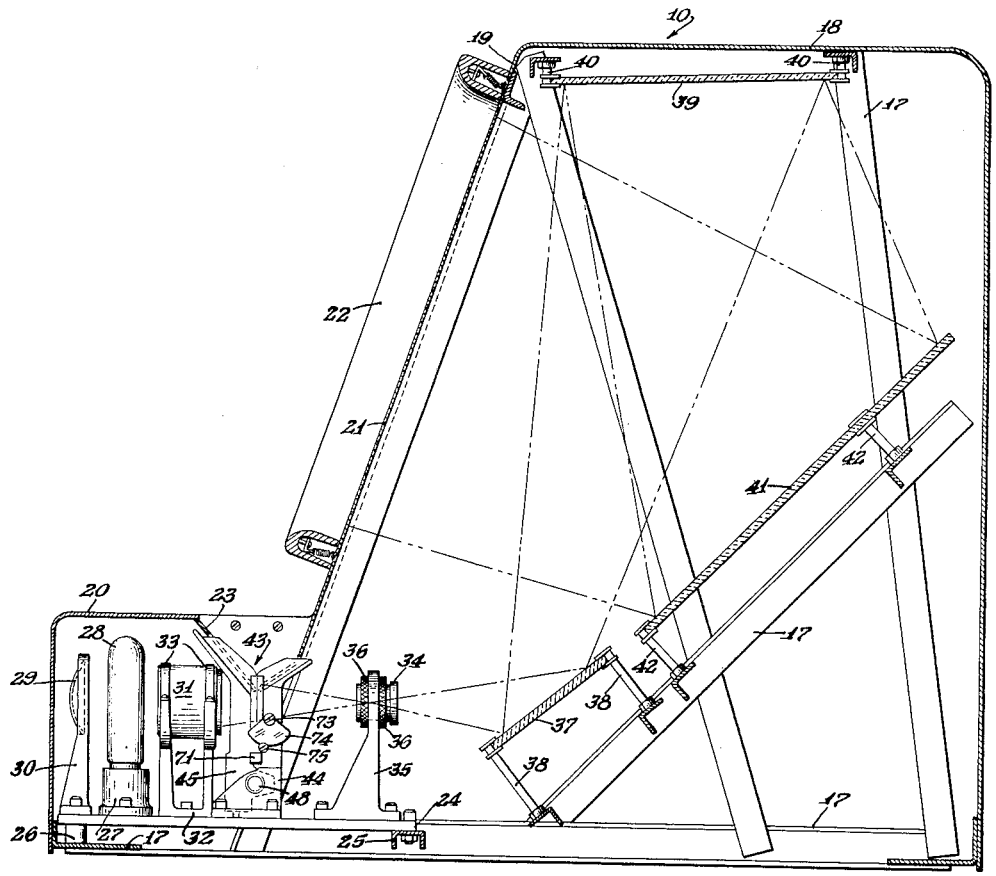
Fig. 2 is a face view of one form of card embodying micro-films and which is adapted to be handled in the apparatus shown in Fig. 1.
Fig. 3 is a fragmentary vertical transverse sectional view on the line 3—3 of Fig. 2, said view being on an enlarged scale for purposes of clearer illustration.

Referring more particularly to Fig. 1 of the drawings, the present invention is herein illustrated and described as embodied in a projecting and viewing apparatus, indicated generally at 10, which is particularly, although not exclusively, adapted for projecting and viewing micro-films mounted in apertured record cards of the type commonly employed in connection with known and existing record card tabulating and sorting systems and machines. There is shown in Figs. 2 and 3, one form of record card of this type, indicated at 11, having two picture-carrying micro-films 12 mounted therein for classification and sorting purposes in a manner well understood in the art of tabulating and sorting record cards, and which are adapted to be individually projected and viewed in the instant apparatus for examination and studying purposes as hereinafter described. Card 11 is of the oblong type and is formed of single ply cardboard or heavy relatively stiff paper material.

The micro-films 12 are mounted within apertures 13 of a corresponding size and shape formed in card 11, said apertures being located centrally between the upper and lower edges of said card and inwardly a corresponding distance from each side edge of the card. The micro-films 12 are retained in apertures 13 and secured to card 11 by means of transparent or translucent adhesive coated cover sheets 14 which are adhesively secured to the upper surface of said card within compressed portions 15 thereof surrounding the apertures 13. The cover sheets 14 are preferably provided with died-out windows 16 smaller than the card apertures 13 to facilitate the transmission of light through the films 12.

The projecting and viewing apparatus 10 embodying the present invention comprises a welded skeleton framework 17 (Fig. 1) enclosed within a casing 18 suitably formed to provide a forwardly inclined portion 19 and a horizontal shelf 20 extending rearwardly of said inclined portion and below the latter. The inclined portion 19 of casing 18 is provided centrally thereof with an enlarged aperture across which extends a viewing screen 21 of a suitable translucent material such as, for example, cellulose acetate, paper, cloth, or the like, and arranged within a hood-like frame 22 secured in a suitable manner to said casing. The shelf 20 is adapted to support a stack of the cards 11 in a convenient position for inserting said cards one after another into the apparatus 10 for projection of the micro-films 12 carried by said cards onto the screen 21 as hereinafter described. Shelf 20 has a front portion thereof removed to receive a transverse trough-like card guide 23 which is bolted or otherwise suitably secured to the side walls of casing 18 and is provided in its lower end with a transverse slot through which the cards 11 are successively passed into the apparatus 10.

Centrally disposed within casing 18 and below shelf 20 is a base plate 24 (Fig. 1) which is bolted or otherwise suitably secured at one end thereof to a transversely extending channel-bar 25 forming part of the framework 17. The opposite end of base plate 24 is bolted or otherwise suitably secured to a spacer-post 26 which is welded or otherwise suitably secured to the framework 17. Suitably secured to the upper surface of base plate 24 is a socket 27 carrying an electrical projection lamp 28 which is connected with a suitable source of electrical current and is illuminated under the control of suitable electrical switch means (not shown). Disposed directly in back of the lamp 28 is a concave reflector or mirror 29 suitably carried by a bracket 30 which is bolted or otherwise suitably secured to the base plate 24. Disposed directly in front of the lamp 28 is a suitable condenser lens including a cylinder 31 which rests in semi-circular portions of a bracket 32 that is bolted or otherwise suitably secured to the base plate 24. Lens cylinder 31 is adjustably clamped to bracket 32 by means of bands 33 which pass around the upper half of said cylinder and are secured to said bracket. Spaced a suitable distance forwardly of condenser lens 31 and disposed in direct horizontal alignment with said lens is a suitable projecting lens including an externally threaded cylinder 34 which is adjustably fitted in a suitable clearance opening in a bracket 35 for focusing of the projected image on the screen 21. Bracket 35 is bolted or otherwise suitably secured to the base plate 24, and lens cylinder 34 is adjusted by means of knurled nuts 36 threaded thereon and engaging opposite sides of said bracket.

Spaced a suitable distance forwardly of the projecting lens 34 and disposed in an upwardly and rearwardly inclined position in the path of the rays of light from said lens is a relatively small light reflecting element 37, such as a flat mirror, which is mounted on the framework 17 by suitable means such as, stud elements 38. The reflecting element 37 as so positioned is effective to receive the light rays from projecting lens 34 and reflect said rays upwardly and forwardly, as shown in broken lines in Fig. 1. Disposed adjacent the top of casing 18 and in a downwardly and forwardly inclined position is a second somewhat larger light reflecting element 39, such as a flat mirror, which is mounted on the framework 17 by suitable means such as, stud elements 40. The reflecting element 39 as so positioned is effective to reflect the light rays, as reflected from the reflecting element 37, downwardly and forwardly, as shown in broken lines in Fig. 1. Spaced a suitable distance forwardly of the reflecting element 37 and downwardly of the reflecting element 39 is a third still larger light reflecting element 41, such as a flat mirror. This reflecting element 41 is disposed in an upwardly and rearwardly inclined position and is operative to receive the light rays reflected from the reflecting element 39 and reflect the same upwardly and rearwardly onto the viewing screen 21, as shown in broken lines in Fig. 1. The reflecting element 41 is mounted on the framework 17 by suitable means such as, stud elements 42. By virtue of the triple mirror arrangement 37, 39, 41 the effective optical distance between the projecting lens 34 and the screen 21 is so increased within the casing 18 that the image or picture on the film 12 will be considerably magnified on said screen and, hence, may be easily and conveniently observed in detail.

In projecting the micro-films 12 onto the screen 21, the cards 11 are manually inserted edgewise into the apparatus 10 through the slot in the card guide 23 and positioned between the condenser lens 33 and the projecting lens 34. Novel means are provided for receiving and positioning each inserted card 11, whereby the micro-film 12 to be projected will be accurately centered with respect to the lenses 31, 34, and the picture or image on said film will be projected onto the screen 21 in the desired upright naturally handed position. As herein shown, particularly in Figs. 4, 5 and 6, said card receiving and positioning means, indicated generally at 43, comprise two transversely extending complementary plate-like members 44 and 45 which are vertically disposed in face to face parallel relation between the lenses 33, 34 and with their opposed inner surfaces substantially in vertical alignment with the slot in the card guide 23.

Member 44 is secured to the base plate 24 by suitable means such as, bolts 46 (Figs. 4, 5 and 6), and is provided at the upper end thereof with an upwardly and rearwardly inclined portion 47 which projects through a suitable opening or window formed in the front portion of the card guide 23. Member 45 is pivotally mounted for swinging movement toward and away from member 44 and for this purpose member 45 is fixed adjacent the lower end thereof on a short cross-pin 48 which is journalled in suitable bearings provided in and adjacent the lower end of member 44. Member 45 is provided at the upper end thereof with an upwardly and forwardly inclined portion 49 terminating in a rearwardly extending horizontal portion 50 which, in turn, terminates in a relatively short upwardly and forwardly inclined portion 51. The inclined portion 49 of member 45 projects through a suitable opening or window formed in the rear portion of the card guide 23, and the inclined portion 51 of said member is disposed in back of said card guide and operates as a shield to prevent the escape of light from lamp 28 through said window. The portions 47 and 49 of members 44 and 45, respectively, serve to deflect and guide the card 11 between said members.

Member 45 is yieldingly urged toward member 44 by two transversely spaced spring-pressed plungers 52 (Figs. 4 and 5) which are slidably mounted in suitable openings 53 formed in the lower end of said member. Plungers 52 projected downwardly beyond the lower end of member 45 into engagement with the upper surface of the base plate 24, and the compression coil springs 54 for said plungers are disposed within the openings 53 and they engage against the inner end walls of said openings and against the upper ends of said plungers.

Members 44 and 45 are provided with aligned apertures 55 and 56, respectively (Figs 4, 5 and 6), which are located in direct horizontal alignment with the lenses 33 and 34, said apertures being of the same shape as the micro-films 12 but larger than the latter. The inner card receiving surface of member 44 is recessed across the aperture 55 to receive therein a presser plate 57 which is formed of a rigid, clear transparent material such as, optical glass, and covers said aperture. The opposite side edges of presser plate 57 are bevelled as indicated at 58 (Fig. 6) and said plate is confined between two retainers 59 formed with similarly bevelled ledges 60 which project over and are adapted to be engaged by the plate to hold the latter on member 44. The retainers 59 are secured, as by bolts 61, to member 44 with their outer surfaces substantially flush with the inner card receiving surface of said member. The presser plate 57 is yieldingly urged toward the ledges 60 by four compression coil springs 62 which are disposed within suitable openings 63 formed in the member 44, said springs having corresponding ends thereof engaging against the adjacent flat surface of said plate and the opposite ends engaging against the inner end walls of said openings. Springs 62 are so chosen that the tension thereof combined is less than the tension of plunger-springs 54 combined so as to enable yielding movement of presser plate 57 and full closing of holder member 45 on the inserted card 11. The bevel 58 at each side edge of presser plate 57 is slightly longer than the bevel on each ledge 60, as viewed in Fig. 6, so that said plate normally projects a slight distance beyond the inner card receiving surface of member 44.

The card receiving surface of member 45 is also recessed across the aperture 56 to receive therein a presser plate 64 (Figs. 5 and 6) which is formed of a rigid, clear transparent material such as, optical glass, and covers said aperture. The opposite side edges of presser plate 64 are bevelled as indicated at 65 and said plate is confined between two retainers 66 formed with similarly bevelled ledges 67 which project over and are adapted to be engaged by the plate to hold the latter on member 45. The retainers 66 are secured, as by bolts 68, to member 45 with their outer surfaces substantially flush with the inner card receiving surface of said member. This presser plate 64 is, however, rigidly held in engagement with the ledges 67 on retainer 66 by four set-screws 69 which are threaded through suitable threaded openings in member 45 and engage the adjacent flat surface of said plate. Screws 69 are locked in adjusted positions by lock nuts 70 threaded thereon and tightened against the adjacent surface of member 45. The bevel 65 at each side edge of presser plate 64 is slightly longer than the bevel on each ledge 67, as viewed in Fig. 6, so that said presser plate also projects a slight distance beyond the inner card receiving surface of member 45 when clamped to the ledges 67 by the screws 69. If desired, the presser plate 64 may be mounted so that the outer surface thereof is flush with the inner card receiving surface of member 45.

The opposed yieldingly and rigidly mounted presser plates 57 and 64, respectively, operate to hold the card 11, inserted between the members 44, 45, in an upright position, and to hold particularly the micro-film 12 to be projected in an absolutely flat condition, whereby a clear undistorted image of the picture on the film will be projected onto the screen 21. Additionally, the yieldable mounting of the presser plate 57 and the yieldable clamping action of the presser plate 64 afforded by the movable spring-urged member 45 compensates for any variations in the thickness of the cards 11 and any irregularities in the surfaces thereof.

Disposed between the members 44, 45 and below the apertures 55, 56 therein is a lower card-stop 71 (Figs. 4, 5 and 6) in the form of a square bar which extends beyond opposite sides of said members and is secured, as by bolts 72, to the member 44. Stop-bar 71 projects inwardly and outwardly beyond the inner card receiving surface of member 44, the latter and also member 45 being undercut for this purpose. Stop-bar 71 is so located that the distance between the upper card engaging surface thereof and the horizontal center-line of the apertures 55, 56 in members 44 and 45, respectively, is the same as the distance between the horizontal center-line of the micro-films 12 on card 11 and the upper or lower longitudinal edges of said card, and between the vertical center-line of each film and the adjacent vertical side edge of the card. Accordingly, when a card 11 is inserted edgewise between the members 44, 45 and its upper, lower or either side edge is engaged with the stop-bar 71, the micro-film 12 to be projected will be accurately centered in a vertical direction with respect to the apertures 55, 56 in said members for accurate transmission of the light rays from condenser lens 31 therethrough.

Pivotally mounted, as at 72 (Figs. 1, 4 and 6), at one side of the member 44 is a lateral card-stop 74 in the form of an overbalanced segmental-shaped plate which normally rests, as shown in Fig. 1, with a portion thereof projecting rearwardly beyond the opposed inner surfaces of the members 44, 45. A headed shoulder-bolt 75 threaded into member 44 and overlapping the lower arcuate edge of stop-plate 74 holds the latter against lateral outward displacement away from said member. Pivotally mounted, as at 76 (Figs. 4, 5 and 6) at the other side of member 44 is a second lateral card-stop 77 in the form of an overbalanced segmental-shaped plate which normally rests, as shown in full lines in Fig. 5, with a portion thereof projecting rearwardly beyond the opposed inner surfaces of the members 44, 45. A headed shoulder-bolt 78 threaded into member 44 and overlapping the lower arcuate edge of stop-plate 77 holds the latter against lateral outward displacement away from said member. The stop-plates 74, 77 are so located that the distance between said plates is substantially the same as the width or shorter dimension of the card 11, and that the distance from the vertical center-line of the apertures 55, 56 in members 44 and 45, respectively, to each plate is equal to the distance between the vertical center-line of each film 12 on card 11 and the adjacent vertical side edge of said card, and between the horizontal center-line of the film and the upper or lower longitudinal edges of the card.

In the operation of the apparatus thus described, let it be assumed, by way of example, that it is desired to project onto the screen 21, the micro-film 12 that is located at the left-hand side of the card 11, as viewed in Fig. 2, and that the lamp 28 is connected to a suitable source of electrical current and is illuminated. Let it further be assumed that the picture or image on the said film 12 is naturally handed and has its horizontal extending transversely of the film.

The operator, with one hand placed over the card guide 23 and engaging the portion 49 of holder-member 45, moves said member rearwardly to the broken line position shown in Fig. 5, thus opening the card holder 43. Thereupon the operator, with the other hand, first turns the card 11 through an angle of 180° in the clockwise direction, as viewed in Fig. 2, and then inserts said card edgewise into the opened holder 43 with its normal top longitudinal edge leading and overlying the left-hand stop-plate 77 only. The card 11 is then moved farther downwardly until the leading or normal top edge of said card engages the stop-bar 71 and simultaneously with such engagement the card is moved laterally toward the right (Fig. 4) until the normal left-hand edge thereof engages the right-hand stop-plate 74. Card 11 will then occupy the position shown in broken lines at A in Fig. 4, whereupon the film 12 will be accurately centered vertically and horizontally with respect to the apertures 55, 56 in holder 43, and with respect to the optical axis of the optical system comprising the lamp 28, the condenser lens 31, and the projecting lens 34.

The operator then releases the holder-member 45, whereupon it is moved forwardly or toward the right (Fig. 5) by the action of the spring-pressed plungers 52 to its original full line position, thus closing the card holder 43 and causing the presser plate 64 to yieldingly press the card against the yieldable presser plate 57 and hold said card and the film 12 flat and in a vertical position. Thereupon, the image or picture on the film 12 is projected onto the screen 21 in the proper degree of magnification and in the desired upright naturally handed position for examination and studying purposes.

It will be noted that when the card 11 is inserted into the opened holder 43 and moved downwardly into engagement with the stop-bar 71 as previously described, the left-hand stop-plate 77 (Figs. 4 and 5) is moved or swung forwardly by said card out of its normal card stopping position, as shown in broken lines in Fig. 5, so as to present no interference to properly locating said card in the holder 43 as previously described.

Let it now be assumed that the projection of the image or picture onto the screen 21 in upright but opposite handed position is deemed sufficient for examination and studying purposes. Under these conditions, the operator first turns the card 11 facewise on an axis extending longitudinally of the card and then inserts said turned card edgewise into the opened holder 43 with its normal top edge leading and overlying the right-hand stop-plate 74 only. The card 11 is then moved farther downwardly until its leading or normal top edge engages the stop-bar 71 and simultaneously with such engagement the card is moved laterally toward the left (Fig. 4) until the normal left-hand edge of said card engages the left-hand stop-plate 77. Card 11 will then occupy the position shown in broken lines at B in Fig. 4, whereupon the film 12 will be accurately centered vertically and horizontally with respect to the apertures 55, 56 in holder 43, and with respect to the projecting lens 34 and the rays of light from the condenser lens 31. Upon release of the holder-member 45 and closing of the card holder 43, the image or picture on the film 12 will be projected onto the screen 21 in the proper degree of magnification and in an upright but opposite handed position for the observance thereof.

It will be noted that when the card 11 is inserted into the opened holder 43 and moved downwardly into engagement with the stop bar 71 as just described, the right-hand stop-plate 74 (Figs. 4 and 6) is moved or swung forwardly by said card out of its normal card stopping position, as shown in full lines in Fig. 6, so as to present no interference to properly locating said card in the holder 43 for the purpose just described.

Let it now be assumed that the image or picture is photographed on the film 12 with its horizontal extending longitudinally of the film, and that the latter is mounted in card 11 with the top of said picture or image facing the left-hand edge (Fig. 2) of said card. Under these conditions, the card 11 is turned edgewise through an angle of ninety degrees in the counterclockwise direction, as viewed in Fig. 2, and then inserted edgewise into the opened card holder 43 with its left-hand edge (Fig. 2) leading and moved downwardly between both of the stop-plates 74 and 77 until said edge of the card contacts the stop bar 71. Card 11 will then occupy the position shown in broken lines at C in Fig. 4, whereupon the micro-film 12 will be accurately centered with respect to the apertures 55, 56 in holder 43 and with respect to the optical axis of the optical system, and the picture or image will be projected onto the screen 21 in the desired upright naturally handed position.

Let it now be assumed that the operator desires to project onto the screen 21 the micro-film 12 that is located at the right-hand side of the card 11, as viewed in Fig. 2. Under these conditions, the card 11 is first turned through an angle of 180° in the counter-clockwise direction, as viewed in Fig. 2, and then inserted edgewise into the opened holder 43 with its normal top longitudinal edge leading and overlying the right-hand stop-plate 74 only. The card 11 is then moved farther downwardly until the leading or normal top edge of said card engage the stop-bar 71 and simultaneously with such engagement the card is moved laterally toward the left (Fig. 4) until the normal right-hand edge thereof engages the left-hand stop-plate 77. Card 11 will then occupy a position corresponding to the B position of said card shown in broken lines in Fig. 4. Thereupon, the said film 12 will be accurately centered with respect to the apertures 55, 56 in holder 43, and with respect to the projecting lens 34 and the rays of the light from the condenser lens 31 and, hence, the picture or image on said film will be projected onto the screen 21 in upright naturally handed position.

It will be noted that when the card 11 is inserted into the opened holder 43 and moved downwardly into engagement with the stop bar 71 as just described, the right-hand stop plate 74 (Figs. 4 and 6) is moved or swung forwardly by said card out of its normal card stopping position, as shown in full lines in Fig. 6 so as to present no interference to properly locating said card in the holder 43.

For projection of the picture or image onto the screen 21 in upright but opposite handed position, the card 11 is merely turned facewise on an axis extending longitudinally of the card and then placed into the card holder 43 so that it occupies a position corresponding to the A position of said card shown in broken lines in Fig. 4. The right-hand stop-plate 74 is then employed to locate the card and the left-hand stop-plate 77 is displaced by the card from its normal card stopping position.

Let it now be assumed that the image or picture is photographed on the film 12 just referred to with its horizontal extending longitudinally of the film, and that the latter is mounted in card 11 with the top of said picture or image facing the right-hand edge (Fig. 2) of said card. Under these conditions, the card 11 is turned edgewise through an angle of ninety degrees in the clockwise direction, as view in Fig. 2 and then inserted edgewise into the opened card holder 43 with its right-hand edge (Fig. 2) leading and moved downwardly between both of the stop-plates 74 and 77 until said edge of the card contacts the stop-bar 71. Card 11 will then occupy a position corresponding to the C position of said card shown in broken lines in Fig. 4. Thereupon, the micro-film 12 will be accurately centered with respect to the apertures 55, 55 in holder 43 and with respect to the projecting lens 34 and the rays of light from the condenser lens 31, and the picture or image will be projected onto the screen 21 in the desired erected or upright position. It will be understood that if the said film 12 is mounted in the card 11 with the picture or image naturally handed, said card is also turned facewise on an axis extending longitudinally of the card before the latter is inserted into the card holder 43. This operation is necessary only when the image or picture on the screen 21 in naturally handed position is desired.

It will be noted that in the event the card 11 is inserted into the holder 43 with its leading edge overlying both stop-plates 74, 77 or the stop-plate required for a particular location of said card, said stop-plates or stop plate will simply be displaced by the card from normal card stopping position, and by merely moving the card laterally in the proper direction sufficiently to clear the required stop-plate the latter will automatically return by gravity to its original active position.

Although only one embodiment of the invention has been described in the foregoing specification and illustrated in the accompanying drawings, it is to be expressly understood that the same is not limited to said embodiment or to the particular type of card disclosed. Obviously, other types of record cards, as well as ordinary cards and other flat card-like members having one or more films mounted thereon in various ways and in similar locations may be employed in the disclosed apparatus. Various changes may be made in the structure, particularly in the design and arrangement of the parts illustrated, without departing from the spirit and scope of the invention, as will now be clear to those skilled in the art. For example, the stops 71, 74 and 77 may be made adjustable or may be relocated to accommodate any location of the film on the card. Additionally, only one light reflecting element or mirror suitably positioned adjacent the front wall of casing 18 may be employed in lieu of the disclosed triple mirror arrangement. For a definition of the limits of the invention, reference is had primarily to the appended claims.

What is claimed is:

1. In apparatus of the character described for projecting a selected one of two relatively spaced micro-films carried by an apertured oblong card adjacent opposite side edges thereof, a projector for projecting said films, means including a bottom stop for receiving said card edgewise and for supporting the same in the optical path of said projector with said films vertically centered with respect to said projector, a first side stop arranged at one side of said projector for locating said card in one lateral position with one of said films laterally centered with respect to said projector, a second side stop arranged at the opposite side of said projector for locating said card in another lateral position with the other of said films laterally centered with respect to said projector, the space between said first and second stops being less than the longer dimension of the card, and means movably mounting said first and second side stops on said first-named means for independent displacement by the card from their normal card locating positions when said card is inserted into position on said bottom stop, positioning of the card in one or the other of said lateral positions being effected by first selecting the side stop corresponding to the desired lateral position of the card, then inserting the card such that it engages only the other side stop and displaces it from its card locating position, and sliding said card along the bottom stop toward and into engagement with the selected side stop.

2. In apparatus of the character described for projecting a micro-film or the like carried by an apertured oblong card adjacent a side edge thereof, an optical system comprising a light source, a condensing lens and a projecting lens spaced along the optical axis of said system, means arranged between said lenses and including a bottom stop for receiving the card moved edgewise downwardly thereto and for locating said card with the horizontal axis of the film carried thereby intersecting said optical axis, a pair of side stops symmetrically spaced at opposite sides of said optical axis, the space between said side stops being equal to the shorter dimension of the card, one of said side stops serving through engagement of said side edge of the card therewith to locate said card in one lateral position with the vertical axis of said film intersecting said optical axis, the other of said side stops serving through engagement of said side edge of the card therewith to locate said card in another lateral position with the vertical axis of said film intersecting said optical axis, and both of said side stops serving to receive said card therebetween and locate the same in still another lateral position with the said horizontal axis of said film intersecting said optical axis, and means for pivotally mounting said pair of side stops on said first-named means for independent yielding movement upon engagement thereof by the leading edge of said card in the downward movement of the latter toward and into engagement with said bottom stop, positioning of the card in one or the other of said first and second-named lateral positions being effected by first selecting the side stop corresponding to the desired one of said lateral positions for the card, then inserting the card lengthwise and such that it is clear of the selected side stop and overlies the other side stop, moving the card downwardly until it engages the bottom stop thereby displacing the said other side stop from its card locating position, and sliding said card along said bottom stop toward and into engagement with the selected side stop.

3. In apparatus of the character described for projecting a micro-film or the like carried by an apertured card, a projector for projecting the film, and card holding means for holding and locating the card in film projecting position, said card holding means comprising two plate-like members disposed in face-to-face parallel relation and between which said card is edgewise inserted through the upper ends thereof, said members having aligned openings located in the path of said projector, a bottom stop for supporting and locating said card with the film carried thereby vertically centered with respect to said openings, a side stop for locating said card with said film laterally centered with respect to said openings, and means mounting said side stop on one of said members for pivotal movement about a horizontal axis relative to said members.

4. In apparatus of the character described for projecting a micro-film or the like carried by an apertured card, a projector for projecting the film, and card holding means for holding and locating the card in film projecting position, said card holding means comprising two plate-like members disposed in face-to-face parallel relation and between which said card is edgewise inserted through the upper ends thereof, said members having aligned openings located in the path of said projector, a bottom stop for supporting and locating said card with the film carried thereby vertically centered with respect to said openings, a side stop for locating said card with said film laterally centered with respect to said openings, means mounting said side stop at one end of one of said members for pivotal movement relative thereto about a horizontal axis, and means on the said one member for holding said side stop against outward axial displacement relative to said member.

5. An apparatus of the character described for projecting a micro-film or the like carried by an apertured card, a projector for projecting the film, and card holding means for holding and locating the card in film projecting position, said card holding means comprising two plate-like members disposed in face-to-face parallel relation and between which said card is edgewise inserted, said members having aligned openings located in the path of said projector, a bottom stop for supporting and locating said card with the film carried thereby vertically centered with respect to said openings, a side stop spaced from said openings at one side thereof and disposed in the path of the card for locating said card in one lateral position with said film laterally centered with respect to said openings, a second side stop spaced from said openings at the other side thereof and disposed in the path of the card for locating said card in another lateral position with said film laterally centered with respect to said openings, and means mounting said side stops on one of said members for independent pivotal movement out of the path of the card.

6. In apparatus of the character described for projecting a micro-film or the like carried by an apertured card, a projector for projecting the film, and card holding means for holding and locating the card in film projecting position, said card holding means comprising a fixed plate-like member, a complementary pivoted plate-like member disposed in face-to-face parallel relation with said fixed member, resilient means for yieldingly urging said pivoted member toward said fixed member and providing for movement of said pivoted member away from said fixed member for inserting said card edgewise between said members, said members having aligned openings therein located in the path of said projector, a bottom stop carried by one of said members and extending across the opposed inner surfaces of said members for supporting and locating said card with the film carried thereby vertically centered with respect to said openings, a side stop extending across the opposed inner surfaces of said members for locating said card with said film laterally centered with respect to said openings, and means mounting said side stop on one of said members for pivotal movement relative thereto about a horizontal axis.

7. In apparatus of the character described for projecting a micro-film or the like carried by an apertured card, a projector for projecting the film, and card holding means for holding and locating the card in film projecting position, said card holding means comprising a fixed plate-like member having an opening therein located in the path of said projector, a complementary pivoted plate-like member disposed in face-to-face parallel relation with said fixed member and having an opening therein aligned with the opening in said fixed member, resilient means for yieldingly urging said pivoted member toward said fixed member and providing for movement of said pivoted member away from said fixed member for inserting said card edgewise downwardly between said members, a bottom card stop carried by said fixed member and extending across the opposed inner surfaces of said members, a side card stop pivotally mounted on said fixed member for swinging movement relative thereto about a horizontal axis, said side stop normally extending across the inner surfaces of said members, a presser plate of clear transparent rigid material rigidly carried by said pivoted member and extending across the opening therein, a presser plate of clear transparent rigid material loosely carried by said fixed member and extending across the opening therein, and spring means on said fixed member for yieldingly urging said last-named presser plate toward said first-named presser plate.

8. In combination, plate means for supporting an oblong card, a bottom stop mounted on said plate means for locating said card lengthwise in a predetermined vertical position with respect to said plate means, a pair of side stops transversely spaced a distance less than the length of said card, one of said side stops being adapted to locate said card in one predetermined lateral position with respect to said plate means through engagement of a side edge of the card with the inner face of the said one side stop, and the other of said side stops being adapted to locate said card in another predetermined lateral position with respect to said plate means through engagement of a side edge of the card with the inner face of the said other side stop, said card when engaged with one of said side stops extending across and beyond the position occupied by the other of said side stops, and means movably mounting said side stops on said plate means for independent displacement relative to said plate means so that said side stops may be independently removed from card locating positions in order to selectively locate said card in one or the other of said lateral positions.

9. In combination, plate means for supporting an oblong card, a bottom stop mounted on said plate means for locating said card lengthwise or widthwise in a predetermined vertical position with respect to said plate means, a pair of side stops transversely spaced a distance substantially equal to the width or shorter dimension of said card, one of said side stops being adapted to locate said card lengthwise in one predetermined lateral position with respect to said plate means through engagement of a side edge of the card with the inner face of the said one side stop, the other of said side stops being adapted to locate said card lengthwise in another predetermined lateral position with respect to said plate means through engagement of a side edge of the card with the inner face of the said other side stop, said card when engaged with one of said side stops extending across and beyond the position occupied by the other of said side stops, and both said side stops being adapted to cooperatively receive said card widthwise therebetween and locate the same in a third predetermined lateral position with respect to said plate means, and means movably mounting said side stops on said plate means for independent displacement relative to said plate means so that said side stops may be independently removed from card locating positions in order to selectively locate said card in one or the other of said first and second-named lateral positions.

10. In apparatus of the character described for projecting a micro-film or the like carried by an apertured card and located adjacent a side edge of said card, a projector for projecting said film, means including a bottom stop engageable by a longitudinal edge of the card for supporting and locating said card with said film vertically centered with respect to the optical axis of said projector, a side stop located at one side of said projector and engageable by said side edge of the card for locating said card in one lateral position with said film laterally centered with respect to said optical axis, a side stop located at the other side of said projector and engageable by said side edge of the card for locating said card in another lateral position with said film laterally centered with respect to said optical axis, and means for movably supporting said side stops for independent displacement from their normal card locating positions by the card when said card is inserted into position on said bottom stop, positioning of the card in one or the other of said lateral positions being effected by first selecting the side stop corresponding to the desired lateral position of the card, then inserting the card such that it engages only the other side stop and displaces it from its card locating position, and sliding said card along the bottom stop toward and into engagement with the selected side stop.

CLIFFORD P. ROUNSEFELL.

REFERENCES CITED

The following references are of record in the file of this patent:

UNITED STATES PATENTS

| Number | Name | Date |
|---|---|---|
| 598,938 | Johnson | Feb. 15, 1898 |
| 640,188 | Force | Jan. 2, 1900 |
| 1,373,491 | Detwiler et al. | Apr. 5, 1921 |
| 1,657,034 | Porter | Jan. 24, 1928 |
| 1,781,945 | Case | Nov. 18, 1930 |
| 1,930,421 | Ehmer | Oct. 10, 1933 |
| 1,943,673 | Hudson | Jan. 16, 1934 |
| 1,949,067 | Wheelock et al. | Feb. 27, 1934 |
| 2,073,627 | Draeger | Mar. 16, 1937 |
| 2,231,765 | Landrock | Feb. 11, 1941 |
| 2,260,552 | Boni et al. | Oct. 28, 1941 |
| 2,296,344 | Guercio | Sept. 22, 1942 |
| 2,303,633 | Guercio | Dec. 1, 1942 |
| 2,326,042 | Lessman | Aug. 3, 1943 |
| 2,341,093 | Hansen | Feb. 8, 1944 |
| 2,457,914 | Nemeth | Jan. 4, 1949 |
| 2,473,736 | Stern | June 21, 1949 |

FOREIGN PATENTS

| Number | Country | Date |
|---|---|---|
| 485,498 | Great Britain | May 20, 1938 |